Figure 1:
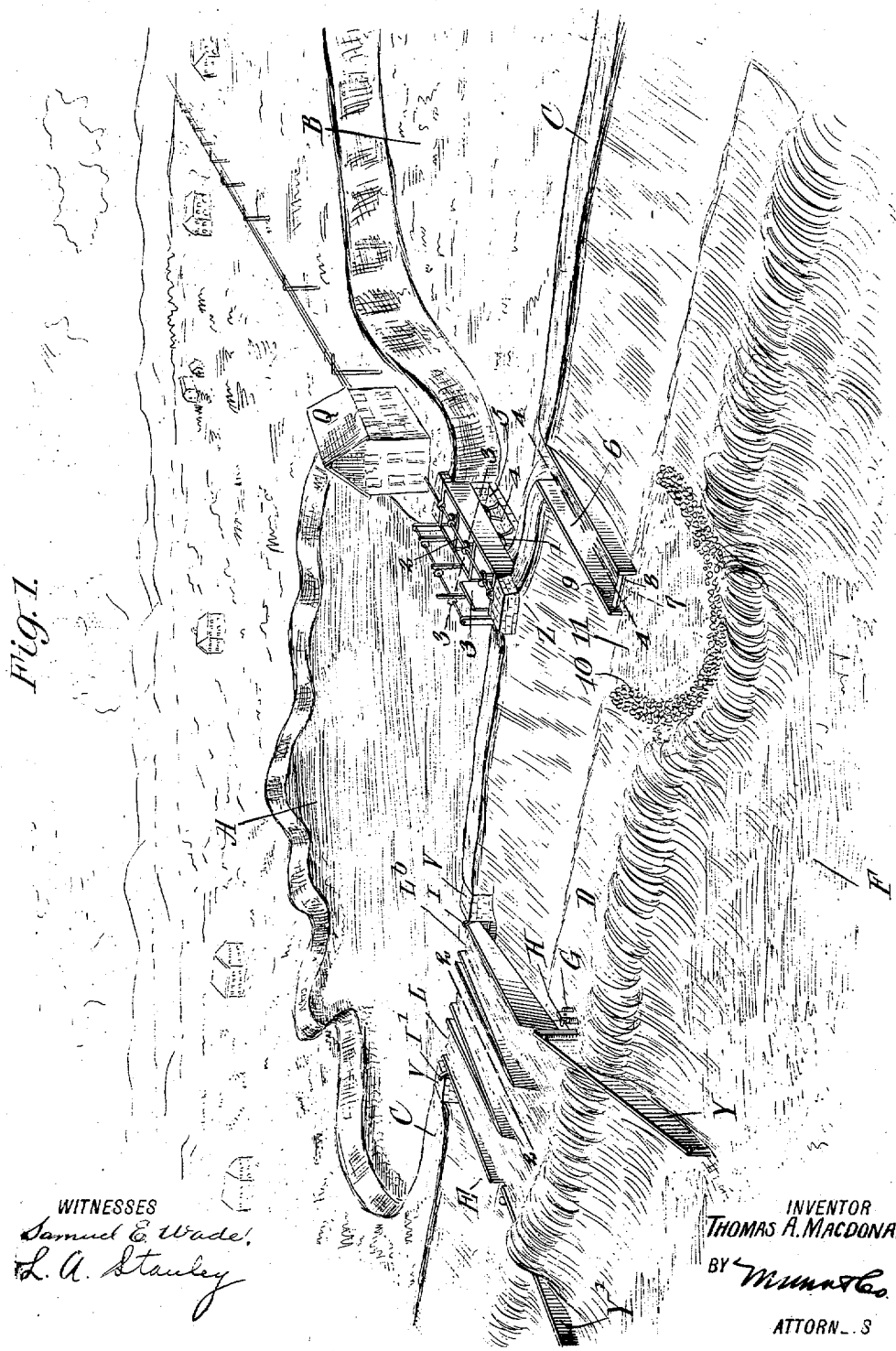

T. A. MACDONALD.
HYDRAULIC POWER SYSTEM.
APPLICATION FILED SEPT. 8, 1909.

969,967.

Patented Sept. 13, 1910.
3 SHEETS—SHEET 1.

WITNESSES
Samuel E. Wade
L. A. Stanley

INVENTOR
Thomas A. Macdonald
BY Munn & Co.
ATTORNEYS

T. A. MACDONALD.
HYDRAULIC POWER SYSTEM.
APPLICATION FILED SEPT. 8, 1909.
969,967.
Patented Sept. 13, 1910.
3 SHEETS—SHEET 2.
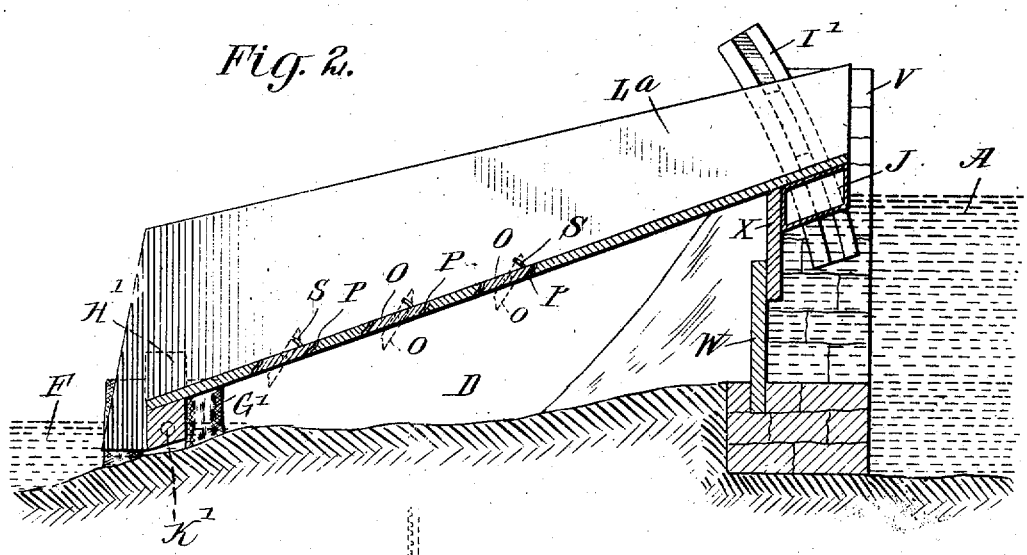
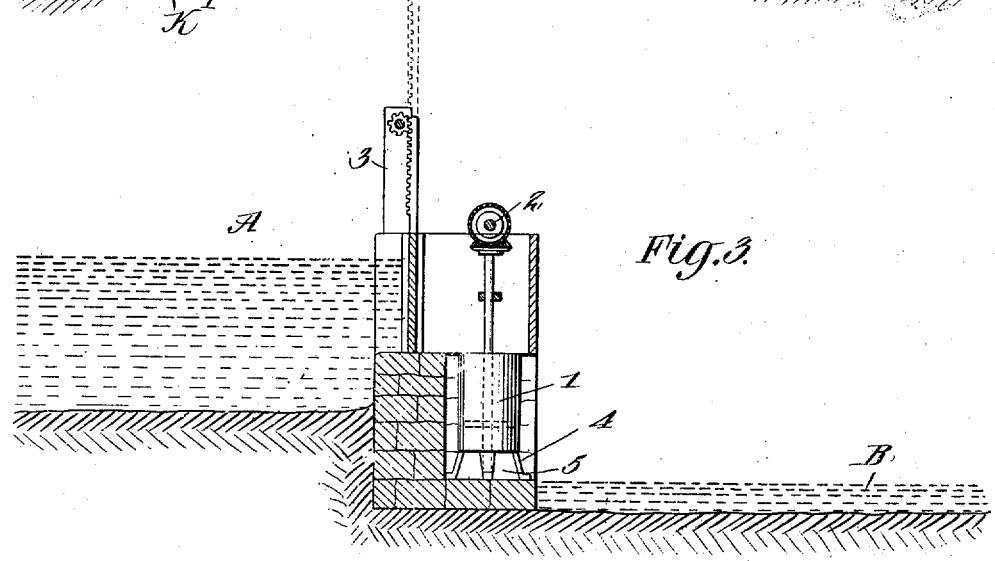
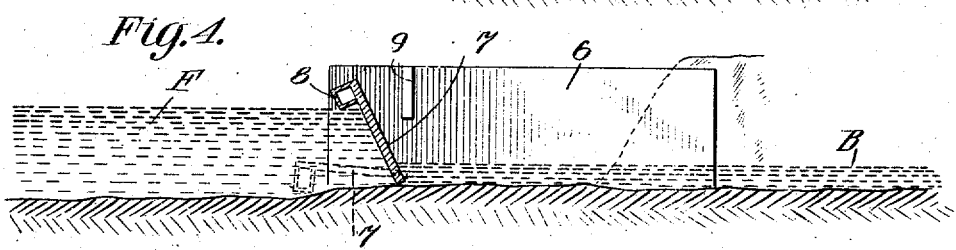
WITNESSES
Samuel E. Wade
L. A. Stanley
INVENTOR
THOMAS A. MACDONALD
BY
Munn & Co
ATTORNEYS

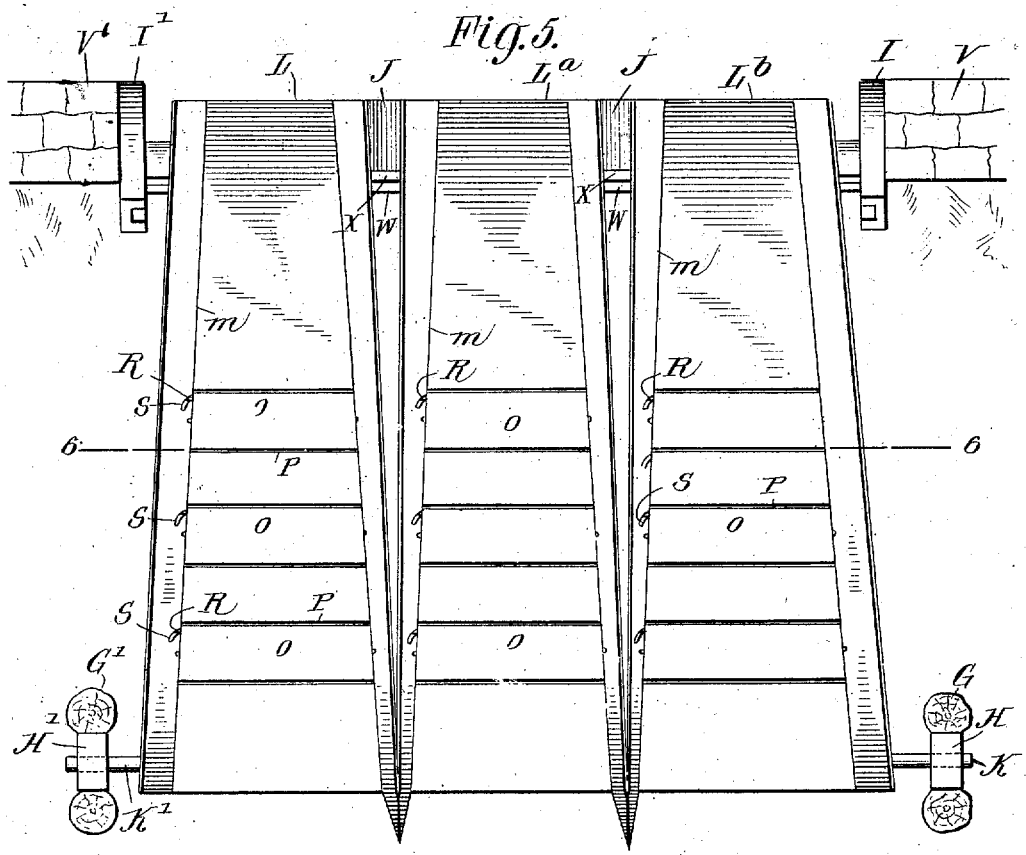
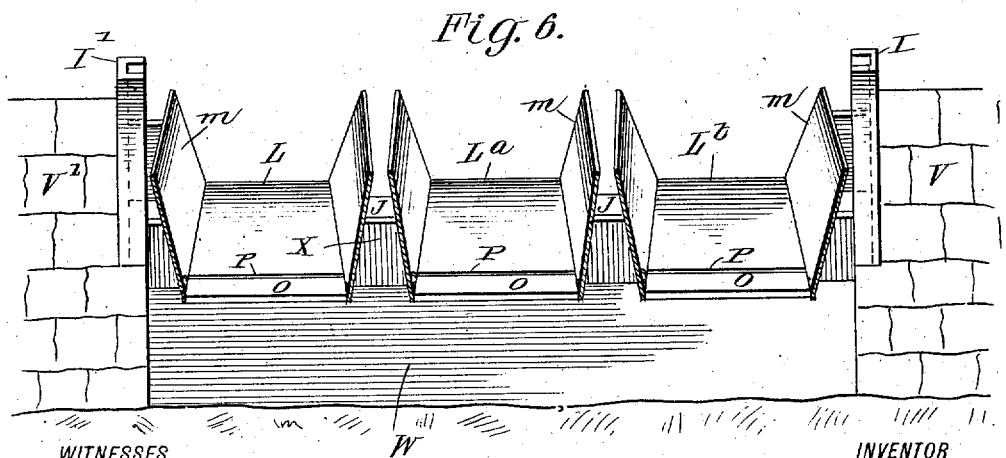

UNITED STATES PATENT OFFICE.

THOMAS A. MACDONALD, OF CLIFTON, NEW JERSEY, ASSIGNOR OF SIXTEEN AND ONE-THIRD ONE-HUNDREDTHS TO ISAIAH E. ZIMMERMAN, OF PATERSON, NEW JERSEY, SIXTEEN AND ONE-THIRD ONE-HUNDREDTHS TO WILLIAM H. CASTLES, OF KINGS-LAND, NEW JERSEY, AND SIXTEEN AND ONE-THIRD ONE-HUNDREDTHS TO GEORGE LENTZ, OF NORTH ARLINGTON, NEW JERSEY.

HYDRAULIC-POWER SYSTEM.

969,967. Specification of Letters Patent. Patented Sept. 13, 1910.

Application filed September 8, 1909. Serial No. 516,720.

*To all whom it may concern:*

Be it known that I, THOMAS A. MACDONALD, a subject of the King of Great Britain, and resident of Clifton, in the county of Passaic and State of New Jersey, have invented certain new and useful Improvements in Hydraulic - Power Systems, of which the following is a specification.

My invention relates to improvements for utilizing the waves and tides of the ocean or other large bodies of water, and it consists in the combinations, constructions and arrangements of parts, herein described and claimed.

An object of my invention is to provide means by which the ceaseless beating of the waves upon the shore may be made to charge a reservoir disposed above the normal level of the water from whence it may be run through turbines or other hydraulic power devices to a reservoir at a lower level, and thence back into the main body of water.

A further object of my invention is to provide a novel form of device for elevating the water from the large body of water into the first named reservoir and for automatically adjusting the height of the elevating apparatus in accordance with the rise of the water in the reservoir.

A further object of my invention is to provide means for preventing the inflow of water from the ocean or main body of water into the lower reservoir.

Other objects and advantages will appear in the following specification, and the novel features will be particularly pointed out in the appended claims.

My invention is illustrated in the accompanying drawings, in which:

Figure 1 is a perspective view showing the preferred arrangement of my hydraulic power system, Fig. 2 is a longitudinal section through one of the water elevating devices, along the line 2—2 of Fig. 1, Fig. 3 is an enlarged section through the turbine gate along the line 3—3 of Fig. 1, Fig. 4 is an enlarged section through the tail race and gate along the line 4—4 of Fig. 1, Fig. 5 is a plan view of the water elevating device, and Fig. 6 is a section along the line 6—6 of Fig. 5.

In carrying out my invention, I preferably select a place along the shore of the ocean in which there is a natural depression such as a bay or inlet, where a small fresh water stream has an opening into the ocean, and which inlet has a narrow mouth with a large surface reaching inland from the shore. By building a dam across the mouth of this inlet or bay, a reservoir is constructed in a simple and remarkably cheap manner high above low water. In the figure, I have indicated this first elevated pond at A, while the second pond which is at a lower level, is shown at B. While I have shown these two ponds as being separated from the main body by a strip of land, C, it will be understood that these ponds or reservoirs may be at a considerable distance from the ocean, and be connected therewith by channels, of greater extent than the cuts in the strips shown in the drawing.

On the shore D, opposite the reservoir A, I install a water elevating device, which I have denoted in general by E, which is designed to elevate the water with great rapidity. The construction of this water elevating device is most clearly shown in Figs. 2, 5, and 6.

Referring particularly to Fig. 2, it will be seen that on the beach D at the edge of the main body of water F, I drive the piles G which hold the standard H the opposite side being provided with similar piles G' and the standard H' (as shown in Fig. 5). Between the two standards H is pivotally mounted on the rods K and K' a plurality of inclined chutes L, L$^a$ and L$^b$. These chutes are wider at their lower ends, and taper toward their upper ends. They are provided with the inclined sides *m* (as shown in the figures). The bottom of each chute is provided with a series of hinged strips O which are pivoted at their centers so as to swing into the position shown in dotted lines in Fig. 2. The normal position of these strips is that shown in Fig. 2, in which there is a curved channel P. These strips are limited by means of pins R which play in slots S in the sides *m*. A space of about four feet may intervene between the strips as the water thus partially lifted has ten seconds to run down and out between each wave, since about six waves to the minute roll in on the shore.

The upper ends of the chutes rest on the float J which is normally buoyed up by the water in the reservoir A. The chutes being pivoted on the rods K K' are arranged to be moved in an arc at their upper ends by the upper movement of the float J, and to be guided in its movement by the guides I and I' which are secured on either side to the abutments V and V'. Secured to the bottom of the chutes is a retaining member X which is in close contact with a retaining wall W.

At Z I have shown the power devices, which are turbines such as that shown at 1 in Fig. 3. Of course there may be any number of these turbines, and they are preferably connected to a common power shaft 2. Each turbine is provided with a gate 3, which may be raised or lowered to bring the turbine into operation. The bottom of the turbine rests upon standards 4, so as to provide a space 5 beneath the turbines to permit the water to flow out therethrough. A power house Q may be conveniently located near the turbines for generating electricity.

The lower reservoir B has communicating with it a tail race 6, which is approximately on a level with the water of the ocean or main body. This tail race has at its outer end a gate 7 provided with a float 8, on one end, adapted to rise and fall with the rise and fall of the water F. A stop member 9 limits the movement of this gate 7.

Around the end of the tail race, where it empties into the main body of water, I construct a break-water, 10 (as shown in Fig. 1). In order to concentrate the force of the waves, I provide the converging extensions Y and Y' which join the lower ends of the outer chutes.

From the foregoing description of the various parts of the device, the operation thereof may be readily understood.

As the waves come in, they are concentrated by the converging members Y and Y', and their force is augmented in the inclined chutes L and L^a and L^b. The water, with the momentum which it has acquired, rushes up these inclined chutes and pours into the reservoir A. In order to prevent the back flow of the water which fails to reach the reservoir from interfering with the oncoming wave, I have provided the swinging members O already explained. The returning water rushes down through the slots P and in so doing causes the members O to swing up into the position shown in dotted lines thus opening these small trap doors, and allowing the water to pass through underneath the device, from whence it may flow to the main body, thus shunting the water around, or rather under the oncoming wave. As the water in the upper reservoir A rises, the float carries the upper end of the inclined chutes higher. The water of the reservoir A being prevented from flowing out by the close contact of the relatively sliding members X and W. Of course there may be as many of these water elevating devices as desired, and the water keeps flowing in to the upper reservoir, constantly. This upper reservoir may be of considerable extent, and preferably embraces many acres. The water from the reservoir may be used as desired, on each or all of the turbines, and the power thus derived may be used for running dynamos, or other power generators. As the water flows into the lower reservoir, the level of the water, of course, rises, but this lower reservoir is also designed to be of such extent that the rise of the water is slow.

As the tide begins to rise, in the main body of water, the gate 7 rises with it, being lifted by the float 8, so that no water from the ocean can flow in through the tail race into the lower reservoir. Now when the tide recedes, the gate 7 lowers into the position shown in dotted lines in Fig. 4, and the water in the reservoir having accumulated to a higher level than the main body of water at low tide flows out through the tail race, and into the larger body.

The waves in the larger body might interfere with the outflow of water through the tail race, but in order to prevent this, I have arranged a breakwater 10, which prevents the waves from doing any damage to the gate 7, and leaves a comparatively still body of water 11 surrounding the end of the tail race.

I have spoken of natural reservoirs, but it will be understood that artificial reservoirs might be economically made, when the power desired thereafter may be obtained at practically no expense, except from the ordinary wear of the operating parts.

I claim:

1. In a hydraulic power system, the combination with a main body of water, of an upper reservoir disposed above the level of said main body of water, means for receiving water from said main body of water, and causing the projection of the water of the waves into said upper reservoir, a float in said upper reservoir connected with said water raising means for elevating and lowering the latter in accordance with the depth of the water in the upper reservoir, a lower reservoir, power devices arranged to be operated by the water from the upper reservoir in its flow to the lower reservoir, a tail race leading from said lower reservoir into said main body of water and having an automatic gate for permitting the flow of water from said lower reservoir into said main body, and for preventing a reverse flow therethrough and a break water closing the discharge end of the tail race.

2. In a hydraulic power system, the combination with a main body of water of an upper reservoir disposed above the level of said main body of water, means for receiving waves from said main body of water and causing the projection of the water of the waves into said upper reservoir, automatic means for adjusting the water elevating means to the height of the water in said upper reservoir, a lower reservoir, power devices arranged to be operated by the water from the upper reservoir in its flow to the lower reservoir, a tail race, and a hinged gate provided with a float arranged to close to prevent the passage of water from said main body into said tail race, and to open to permit the exit of water through said tail race, into said main body.

3. In a hydraulic power system, the combination with a main body of water, of an upper reservoir disposed above the level of said main body of water, an inclined chute for receiving waves from said main body of water and projecting them into said upper reservoir, said chute being hinged at its lower end and being provided with a float at its upper end, disposed in the water of the upper reservoir and adapted to fall with the level of the water, a lower reservoir, and a tail race from said lower reservoir into said main body of water.

4. In a hydraulic power system, a main body of water, a reservoir, a water elevating device for raising the water from the main body into said reservoir, said water elevating device comprising an inclined chute having sides converging toward the top, means for concentrating the waves in said chute, means for preventing the interference of the water from the receding wave with that of an oncoming wave, and means for automatically adjusting the upper level of the inclined chute with respect to the level of the water in the reservoir.

5. In a hydraulic power system, a main body of water, a reservoir, means for elevating the water from the main body of water into said upper reservoir, said means comprising an inclined chute having sides converging toward its upper end, said sides being inclined outwardly, the bottom of said chute being provided with a series of channels and having pivoted strips arranged to be swung into the path of the receding water, to oppose the descent of the latter, and to return the water through the bottom of the chute, thereby eliminating the interference of an oncoming wave with a receding wave.

THOMAS A. MACDONALD.

Witnesses:
  Geo. S. Livingston,
  L. A. Stanley.